US012799911B2

(12) United States Patent
Tapin et al.

(10) Patent No.: US 12,799,911 B2
(45) Date of Patent: Nov. 17, 2026

(54) HYDROGEN REGULATION MODULE FOR A HYDROGEN INTERNAL COMBUSTION ENGINE

(71) Applicant: PHINIA DELPHI LUXEMBOURG SARL, Belvaux (LU)

(72) Inventors: Christophe Tapin, Saint Sulpice de Pommeray (FR); Gavin Dober, Luxembourg (LU); Stéphane Van Den Hende, Marolles (FR)

(73) Assignee: PHINIA DELPHI LUXEMBOURG SARL, Belvaux (LU)

( * ) Notice: Subject to any disclaimer, the term of this patent is extended or adjusted under 35 U.S.C. 154(b) by 0 days.

(21) Appl. No.: 19/106,881

(22) PCT Filed: Aug. 28, 2023

(86) PCT No.: PCT/EP2023/073473
§ 371 (c)(1),
(2) Date: Feb. 26, 2025

(87) PCT Pub. No.: WO2024/046941
PCT Pub. Date: Mar. 7, 2024

(65) Prior Publication Data

US 2026/0063093 A1 Mar. 5, 2026

(30) Foreign Application Priority Data

Aug. 30, 2022 (GB) ..................................... 2212554

(51) Int. Cl.
*F02M 21/00* (2006.01)
*F02M 21/02* (2006.01)
(Continued)

(52) U.S. Cl.
CPC .... *F02M 21/0206* (2013.01); *F02M 21/0227* (2013.01); *F02M 21/0236* (2013.01);
(Continued)

(58) Field of Classification Search
CPC ........... F02M 21/0206; F02M 21/0227; F02M 21/0236; F02M 21/0239; F02M 21/0242;
(Continued)

(56) References Cited

U.S. PATENT DOCUMENTS 1,883,690 A * 10/1932 Gilgenberg ........ G05D 16/0402 137/550
3,211,175 A * 10/1965 Replogle ................ G05D 16/10 137/71
(Continued)

FOREIGN PATENT DOCUMENTS

| | | |
|---|---|---|
| CN | 111365146 A | 7/2020 |
| KR | 20110062357 A | 6/2011 |
| WO | 2011094704 A1 | 8/2011 |

OTHER PUBLICATIONS

International Search Report of the International Searching Authority for Application No. PCT/EP2023/073473 dated Nov. 2, 2023 (2 pages).

*Primary Examiner* — Logan M Kraft
*Assistant Examiner* — Sherman D Manley
(74) *Attorney, Agent, or Firm* — WARNER NORCROSS + JUDD LLP

(57) ABSTRACT

A hydrogen regulation module for a hydrogen internal combustion engine includes a common body that defines therein a gas flow path for a hydrogen stream, the gas flow path extending from an inlet port to an outlet port, the common body integrating: a shut off valve to selectively open or close the flow of hydrogen through the gas flow path; a pressure regulating valve configured to regulate the pressure of the hydrogen stream towards the outlet; a purge valve configured to allow purging the gas flow path downstream of the shut off valve; a first pressure relief valve in fluid communication with the gas flow path downstream of the shut off valve and of the pressure regulating valve; and
(Continued)

a filter unit to retain particles beyond a predetermined particle size, arranged upstream of the shut off valve and pressure regulating valve. A temperature sensor and a pressure sensor on the hydrogen stream are upstream of the shut off valve and of the pressure regulating valve.

14 Claims, 4 Drawing Sheets

(51) Int. Cl.
*F02D 41/00* (2006.01)
*F02M 25/06* (2016.01)

(52) U.S. Cl.
CPC .... *F02M 21/0239* (2013.01); *F02M 21/0242* (2013.01); *F02D 41/0027* (2013.01); *F02M 21/029* (2013.01); *F02M 25/06* (2013.01)

(58) Field of Classification Search
CPC ............. F02M 21/029; F02M 21/0218; F02M 21/023; F02M 25/06; F02D 41/0027; F02D 19/021; Y02T 10/30
See application file for complete search history.

(56) References Cited

U.S. PATENT DOCUMENTS

| | | | | | |
|---|---|---|---|---|---|
| 3,455,323 | A * | 7/1969 | Haupt | G05D 16/2097 | 137/116.5 |
| 4,173,986 | A * | 11/1979 | Martin | F16K 17/168 | 128/205.24 |
| 4,749,005 | A * | 6/1988 | Bergquist | F24C 3/12 | 137/881 |
| 5,755,254 | A * | 5/1998 | Carter | G05D 16/0655 | 137/340 |
| 6,305,401 | B1 * | 10/2001 | Uehara | G05D 16/2095 | 137/487.5 |
| 6,629,544 | B2 * | 10/2003 | Nakajima | F02M 21/0233 | 251/64 |
| 6,705,342 | B2 * | 3/2004 | Santinanavat | G05D 16/2095 | 251/30.01 |
| 6,722,388 | B1 * | 4/2004 | McAden | F16K 27/003 | 73/1.72 |
| 7,100,581 | B2 * | 9/2006 | Ricco | F02D 19/022 | 123/529 |
| 8,117,839 | B2 * | 2/2012 | Ridgway | F02M 21/0239 | 137/340 |
| 8,132,561 | B2 * | 3/2012 | Audisio | F02M 21/0239 | 123/527 |
| 8,181,668 | B2 * | 5/2012 | Yamamoto | G05D 16/0663 | 137/340 |
| 9,318,757 | B2 * | 4/2016 | Koenig | H01M 8/04097 | |
| 10,941,714 | B2 * | 3/2021 | Nishimura | F02B 11/02 | |
| 11,372,431 | B1 * | 6/2022 | Carter | F16K 17/38 | |
| 11,668,256 | B2 * | 6/2023 | Guglielmo | F02B 77/08 | 123/434 |
| 11,714,435 | B2 * | 8/2023 | Carter | G05D 16/107 | 137/505 |
| 11,859,568 | B2 * | 1/2024 | Guglielmo | F02D 19/023 | |
| 2001/0003976 | A1 * | 6/2001 | Lehtonen | F02M 47/043 | 123/299 |
| 2001/0008147 | A1 * | 7/2001 | Miller | G05D 16/109 | 137/505.11 |
| 2003/0168102 | A1 * | 9/2003 | Santinanavat | G05D 16/2095 | 137/489 |
| 2005/0241624 | A1 * | 11/2005 | Ricco | F02M 21/0239 | 123/527 |
| 2008/0022983 | A1 * | 1/2008 | Martindale | F02D 19/0647 | 123/575 |
| 2013/0014729 | A1 * | 1/2013 | Saito | F02D 19/0605 | 123/458 |
| 2013/0295482 | A1 * | 11/2013 | Kim | H01M 8/04201 | 429/444 |
| 2016/0146147 | A1 * | 5/2016 | Mark | F02M 55/025 | 123/525 |
| 2024/0229755 | A1 * | 7/2024 | Shipp | F02M 63/022 | |

* cited by examiner

HYDROGEN REGULATION MODULE FOR A HYDROGEN INTERNAL COMBUSTION ENGINE

CROSS-REFERENCE TO RELATED APPLICATIONS

This application is the U.S. National Stage of International Application No. PCT/EP2023/073473 filed on 28 Aug. 2023, which claims priority to and all advantages of United Kingdom Application No. 2212554.6 filed on 30 Aug. 2022, the contents of which are incorporated herein by reference.

FIELD OF THE INVENTION

The present invention relates to a hydrogen regulation module for a hydrogen internal combustion engine.

BACKGROUND OF THE INVENTION

Hydrogen is increasingly viewed, along with electric vehicles, as one way to slow the environmentally destructive impact of the planet's 1.2 billion vehicles, most of which burn gasoline and diesel fuel. Manufacturers of large trucks, commercial vehicles as well as passenger vehicles are currently developing hydrogen engines, i.e. where hydrogen is used as fuel instead of the usual liquid fuels.

Hydrogen is stored aboard the vehicle in a high-pressure tank, at pressures in the order of 500 to 700 bars and above. The tank is part of a fuel supply system that comprises a variety of components configured to allows discharging predetermined amounts of hydrogen into the respective combustion chambers.

On the downstream, low-pressure side of the fuel supply system is a fuel rail to which a number of fuel injectors are connected. Upstream, thereof, components with various functionalities are required, such as a shut off valve to stop the flow of hydrogen to the fuel rail when the engine is down, and a pressure regulating valve to expand the high-pressure hydrogen flow discharged from the tank to operational pressure in the range of 20 to 40 bars. Conventionally the fuel supply system further comprises a filter, a pressure relief valve configured to open when the pressure downstream of the pressure regulator increases beyond a predetermined pressure threshold. It is also required to monitor the hydrogen temperature and pressure upstream of the regulator.

The integration of the various components in the engine may be somewhat complex, due to different packaging of the individual components. Furthermore, great care must be taken in the assembly/sealing of the components, due to the high ease of leaking of hydrogen.

OBJECT OF THE INVENTION

The object of the present invention is to provide a solution to the above problems, by which packaging and safety are improved.

SUMMARY OF THE INVENTION

The present invention relates to a hydrogen regulation module for a hydrogen internal combustion engine, wherein the hydrogen regulation module (HRM) comprises a common body that defines therein a gas flow path for a hydrogen stream, said gas flow path extending from an inlet port to an outlet port, said common body integrating:

- a shut off valve to selectively open or close the flow of hydrogen through the gas flow path;
- a pressure regulating valve configured to regulate the pressure of the hydrogen stream towards the outlet;
- a purge valve configured to allow purging the gas flow path downstream of the shut off valve;
- a first pressure relief valve in fluid communication with the gas flow path downstream of the shut off valve and of the pressure regulating valve;
- a filter unit to retain particles beyond a predetermined particle size, arranged upstream of said shut off valve and pressure regulating valve; and
- preferably a temperature sensor (40) and a pressure sensor (42) arranged to determine a temperature and a pressure, respectively, of the hydrogen stream upstream of the shut off valve and of the pressure regulating valve.

The invention hence provides a hydrogen regulation module which integrates all of the components at one location thanks to the use of the common body, which is favorable in terms of packaging. The HRM can be tested as a single component, both in terms of operation and in terms of sealing. It thus provides ease of installation in the engine and improved safety.

The functionality of the shut off valve is to allow or stop hydrogen flow through the HRM. In particular the shut off valve must be closed when the engine is off. Preferably, the shut off valve is a normally closed valve, i.e. it is closed by default, without requiring external energy.

The pressure regulating valve, or pressure regulator, regulates the hydrogen pressure towards the engine. Hence the hydrogen path upstream of the pressure regulating valve is the high-pressure side, whereas the part downstream is a low-pressure side. The pressure regulating valve is typically configured to regulate the hydrogen flow in a predetermined ranged, e.g. between 20 and 40 bars.

The purge valve is provided as a safety component that allows purging hydrogen from the fuel delivery circuit in the low-pressure side. That is, activating the purge valve will allow purging/removing hydrogen in the fuel circuit/ducts between the HRM and the fuel rail/injectors.

The shut off valve, pressure regulating valve and purge valve may be designed in any appropriate manner. They conventionally comprise a valve arrangement that is controlled by an actuator.

The first pressure relief valve is a safety component that will be triggered when the pressure in the low-pressure side exceeds a predetermined threshold, thereby opening a flow path for the hydrogen to escape. Any appropriate design can be used.

Conveniently the first pressure relief valve may comprise a check valve or other similar or equivalent valve.

In embodiments, the filter unit is arranged upstream of said shut off valve and of the pressure regulating valve.

In embodiments, the HRM further integrates a second pressure relief valve in fluid communication with the gas flow path upstream of the shut off valve and of the pressure regulating valve. The second pressure relief valve is configured to open when the pressure on the high-pressure side exceeds a predetermined pressure level.

In embodiments, the HRM further integrates an oil dosing device arranged to discharge predetermined amounts of oil in the gas flow path. The oil dosing device may be arranged to discharge predetermined amounts of oil in the gas flow path at a position upstream of the shut off valve and of the pressure regulating valve. This allows bringing some lubricant in the hydrogen gas flow, which is beneficial for mechanical parts.

In embodiments, the HRM further comprises a heat exchanger device arranged to influence a temperature of the incoming hydrogen stream. The heat exchanger may comprise an auxiliary body assembled to said common body, the auxiliary body having therein a fluid channel for conveying a heat-transfer fluid. The heat exchanger allows cooling or heating the HRM common body and thus control the temperature of the hydrogen stream flowing therethrough. Depending on the operating condition heating or cooling may be desirable.

In embodiments, the HRM further integrates a temperature sensor and a pressure sensor arranged to determine a temperature and a pressure, respectively, of the hydrogen stream, preferably upstream of the shut off valve and of the pressure regulating valve. The pressure and temperature sensors can be combined in a same housing.

In embodiments, the shut off valve and pressure regulating valve are combined as a single component, in a same housing.

In general, the shut off valve, pressure regulating valve and purge valve may each comprise a valve seat and valve member arranged in a recess within the common body, and an associated electromagnetic actuator arranged outside the common body, wherein the respective recesses are serially arranged on/along the hydrogen flow path. Hence the components are arranged to interact with the hydrogen flow path to perform their respective functions. The shut off valve and pressure regulating valve are arranged to be traversed by the hydrogen stream. The purge valve can be arranged laterally in communication with the hydrogen flow path.

In embodiments, the HRM further comprises a mounting member assembled to the common body, the mounting member having a predetermined shape configured for assembly in an internal combustion engine. This mounting member may have any desirable shape or design appropriate for mounting in the engine. The HRM common body, optionally with the heat exchanger, may be fixed to the mounting member, which in turn is fixed to the engine.

In embodiments, the HRM may include two pressure regulating valves, in particular for application demanding higher hydrogen flow rates.

According to another aspect, the invention relates to a hydrogen internal combustion engine comprising an engine block with at least one cylinder and a hydrogen supply system comprising at least one fuel injector for injecting hydrogen into the at least one cylinder, and a hydrogen regulation module according to the present disclosure.

In embodiments, the hydrogen regulation module is fixed to a cylinder head of the engine.

In embodiments, the hydrogen regulation module is fixed to the engine block, optionally via a support element.

BRIEF DESCRIPTION OF THE DRAWINGS

The present invention will now be described, by way of example, with reference to the accompanying drawings, in which.

DETAILED DESCRIPTION OF PREFERRED EMBODIMENTS

Figure 1:
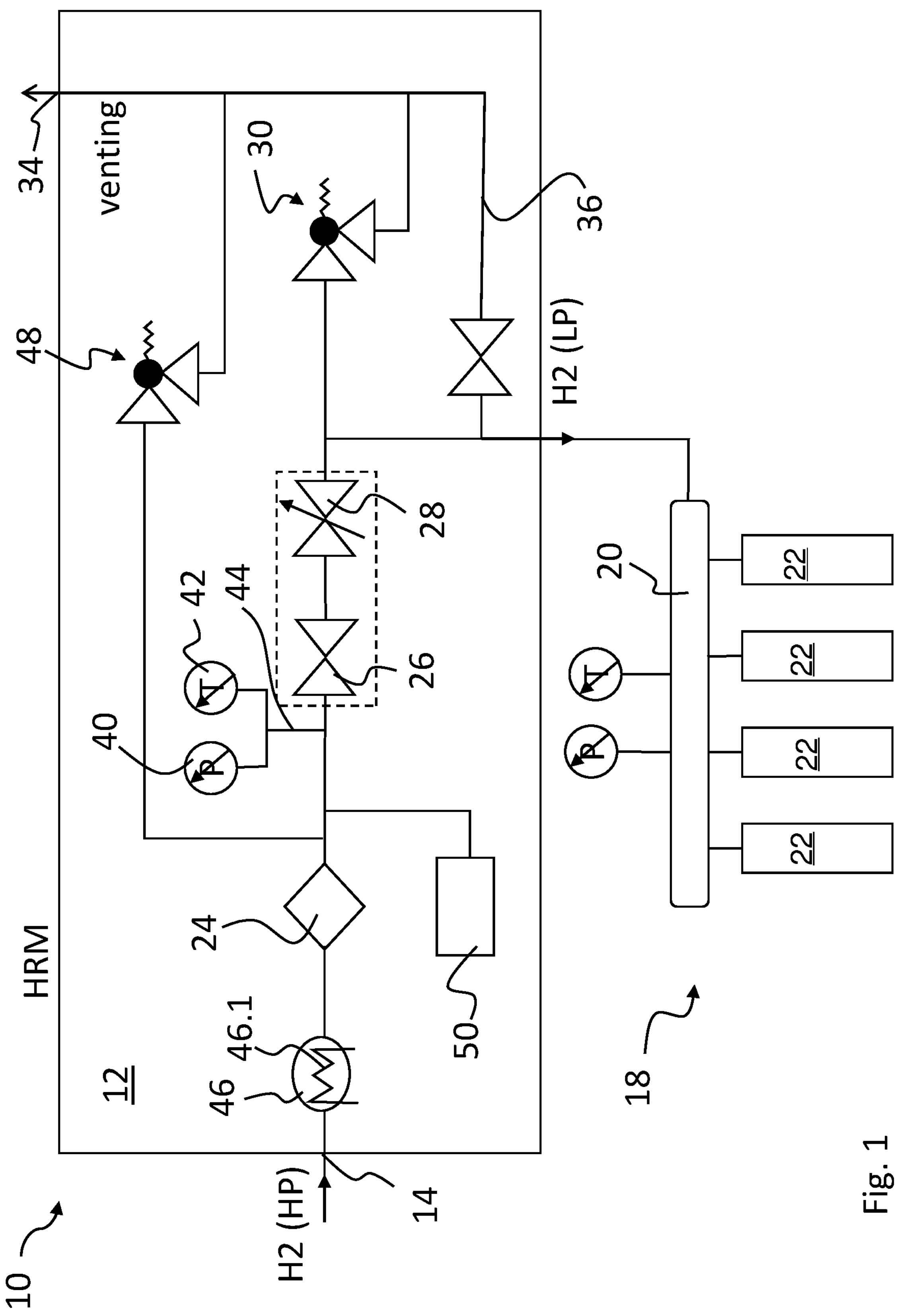
FIG. 1: is a principle diagram of an embodiment of the present hydrogen regulation module.

FIG. 1 is a principle diagram of an embodiment of the present hydrogen regulation module (HRM) 10. The HRM 10 is designed as a module that includes a plurality of components with dedicated functions required for conditioning the hydrogen stream in view of combustion thereof in an internal combustion engine. The HRM 10 comprises a body 12, referred to as common body, which integrates the various components, whereby the common body 12 and components form a single structure. In practice, the common body 12 is configured to accommodate or host the components. The common body may generally be made from a metal, in particular stainless steel or aluminum, preferably with good compatibility with hydrogen.

In FIG. 1, reference sign 12 designates the common body in which a gas flow path 11 (or channel) is arranged. The flow path 11 extends from an inlet port 14, through which hydrogen enters the HRM 10, to an outlet port 16, through which hydrogen is discharged. In practice, the inlet port 14 is connected via a supply piping to a fuel tank in which hydrogen is stored at pressures in the range of 500 to 700 bars, for example. Inlet port 14 is thus an inlet section of the high-pressure side of the HRM 10.

Hydrogen is discharged from the HRM 10 via outlet port 16 at an operating pressure which may typically be between 20 and 40 bars. The low-pressure hydrogen stream is fed from the outlet port 16 to a fuel rail assembly 18 of the engine which comprises a fuel rail 20 connected to a plurality of fuel injectors 22. The fuel injectors 22 may be arranged to allow direct injection of hydrogen into the engine cylinders.

The HRM 10 integrates at least the following components: a filter unit 24, a shut off valve 26, a HP regulator 28, a first pressure relief valve PRV 30 and a purge valve 32.

The filter unit 24 is configured to retain particles beyond a predetermined particle size. It is arranged on the upstream side of the flow path 11, upstream of the shut off valve 26 and HP regulator 28. The filter unit 24 may typically comprise a filter element having a predetermined mesh size, i.e. with opening of given size, which may e.g. be less than 15, 10 or 8 μm.

The shut off valve 26 allows to selectively open or close the flow of hydrogen through the gas flow path 11. The purpose of the shut off valve 26 is to sealingly close the incoming flow of hydrogen when not desired, i.e. typically when the engine is down, to avoid flows or leaks of hydrogen to the non-operating engine. The shut off valve 26 is preferably designed as ‘normally closed’: the valve is closed by default. The shut off valve 26 includes an actuator that allows opening the shut-off valve, i.e. to bring a valve element in an open position away from a valve seat, allowing flow of hydrogen through the valve seat. Such actuator may be of the solenoid type. The valve element may typically be biased in closed position by a spring.

HP regulator 28 is designed to regulate the pressure of the hydrogen stream, i.e. to maintain the pressure within a predetermined pressure range. Preferably, the HP regulator 28 is configured to regulate the pressure downstream of the regulator in a pressure range between 20 and 40 bars. The HP regulator may be of any appropriate design. It may e.g. comprise a valve seat with an orifice that cooperates with a regulator valve member that allows to control the flow cross-section through the regulator orifice. The regulator valve member is actuated via an actuator (e.g. solenoid actuator), by which the position of the valve member relative to the valve seat can be adjusted, and hence the flow cross section adapted. In embodiments, the shut off valve 26 and pressure regulator 28 can be integrated as a single component, as indicated by the dashed line rectangle in FIG. 1.

The first pressure relief valve PRV 30 is a safety component that is designed to open in case the pressure in the hydrogen flow path 11 exceeds a predetermined threshold. The inlet side of pressure relief valve 30 is in communication with the low-pressure side of the hydrogen flow path 11, i.e. downstream of HP regulator 28. The downstream side of the PRV is connected to a venting port 34. PRV 32 may e.g. include a check valve.

The purge valve 32 is positioned downstream of the shut off valve 26 and of the HP regulator 28. The purge valve 32 is arranged in a branch path 36 that connects the hydrogen flow path 11 to the venting port 34. The inlet side of the purge valve 32 is at the pressure of the hydrogen flow path 11. The purge valve 32 may be a normally closed valve (i.e. closed by default) that is selectively controlled to open when it is desired to purge the low-pressure side of the HRM 10. In such case a purge valve electromagnetic actuator is energized to open the purge valve and thereby establish fluid communication between the hydrogen flow path 11 and the venting port 34, hence allowing hydrogen to escape to the environment. Such purging may e.g. be desired after engine shut down, the shut off valve 26 being closed, to purge the low-pressure side. Alternatively, the purge valve may be designed as a normally open valve, which is actuated in closed position by the actuator.

Preferably, the HRM 10 further include a pressure sensor 40 and a temperature sensor 42 accommodated in the common body 12 to sense the hydrogen stream in the flow path 11. Both sensors may communicate with the flow path 11 via a pick-up branch 44. The pressure and temperature sensors 40, 42 can be in a same housing or arranged separately.

In the shown embodiment, HRM 10 includes an optional heat exchanger device 46, which is configured to exchange heat with the common body 12 in order to control the temperature of the hydrogen flow through the flow path 11. In practice a fluid channel can be arranged to extend in the common body 12 and/or in a HEX body attached to the common body 12. A heat-transfer fluid is circulated through channel with an appropriate temperature in order to heat-up or cool down the common body 12 and thus the hydrogen flow through the flow path 11.

For increased safety, the HRM 10 advantageously includes a further pressure relief valve 48 that is designed to open in case the hydrogen pressure in the upstream side exceeds a predetermined threshold. The inlet side of pressure relief valve 48 is in communication with the hydrogen flow path 11 upstream of the shut-off valve 26. The downstream side of PRV2 48 is connected to the venting port 34. PRV2 48 may e.g. include a check valve.

Reference sign 50 indicates an optional oil dosing device, which is configured to deliver predetermined amounts of oil into the stream of hydrogen. Such oil dosing device to provide some lubrication to the fuel delivery system components, in particular to the fuel injectors. In the embodiment the oil dosing device is arranged to discharge oil into the hydrogen flow path 11, on the high-pressure side. Alternatively, the oil dosing device can be arranged after the HP regulator 28.

Figure 2:
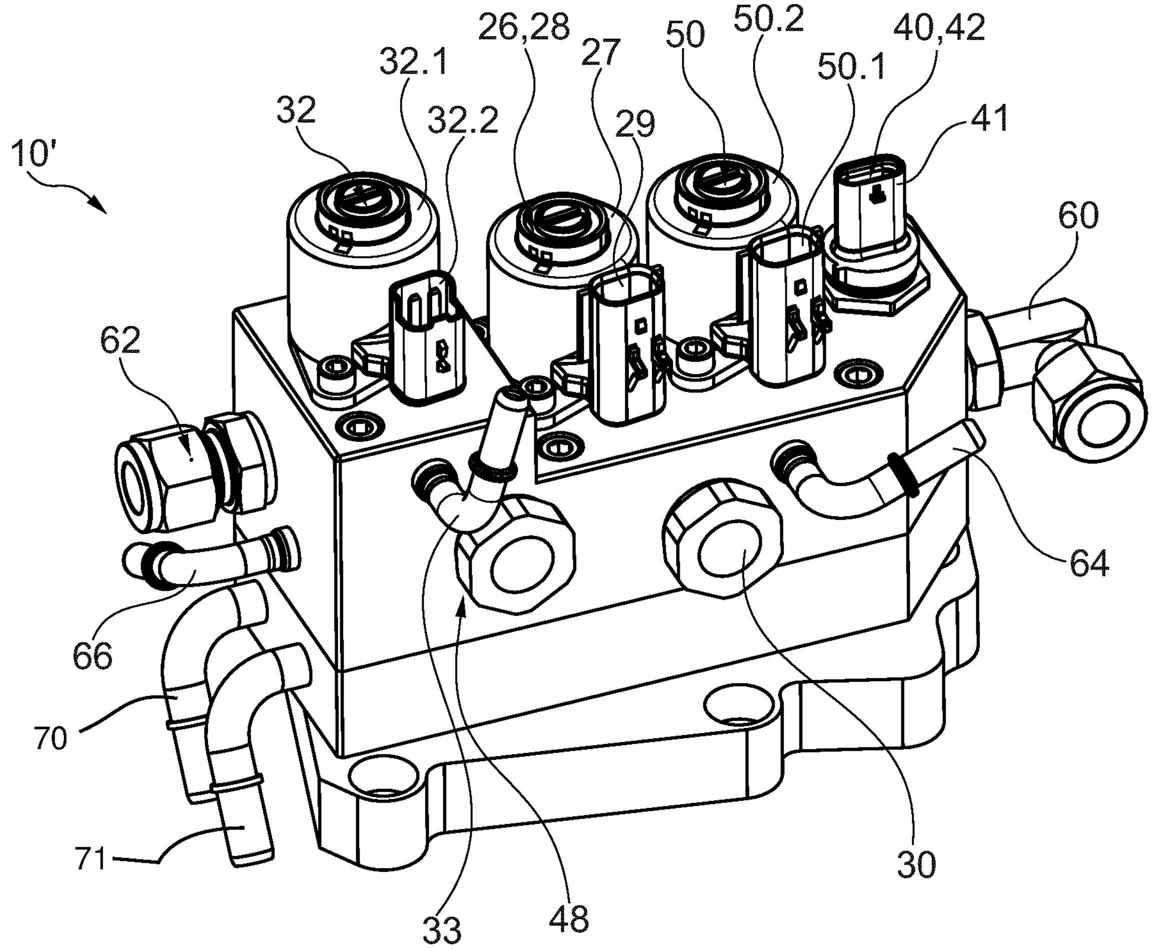
FIG. 2: is an exemplary perspective view of the hydrogen regulation module of FIG. 1.
Figure 3:
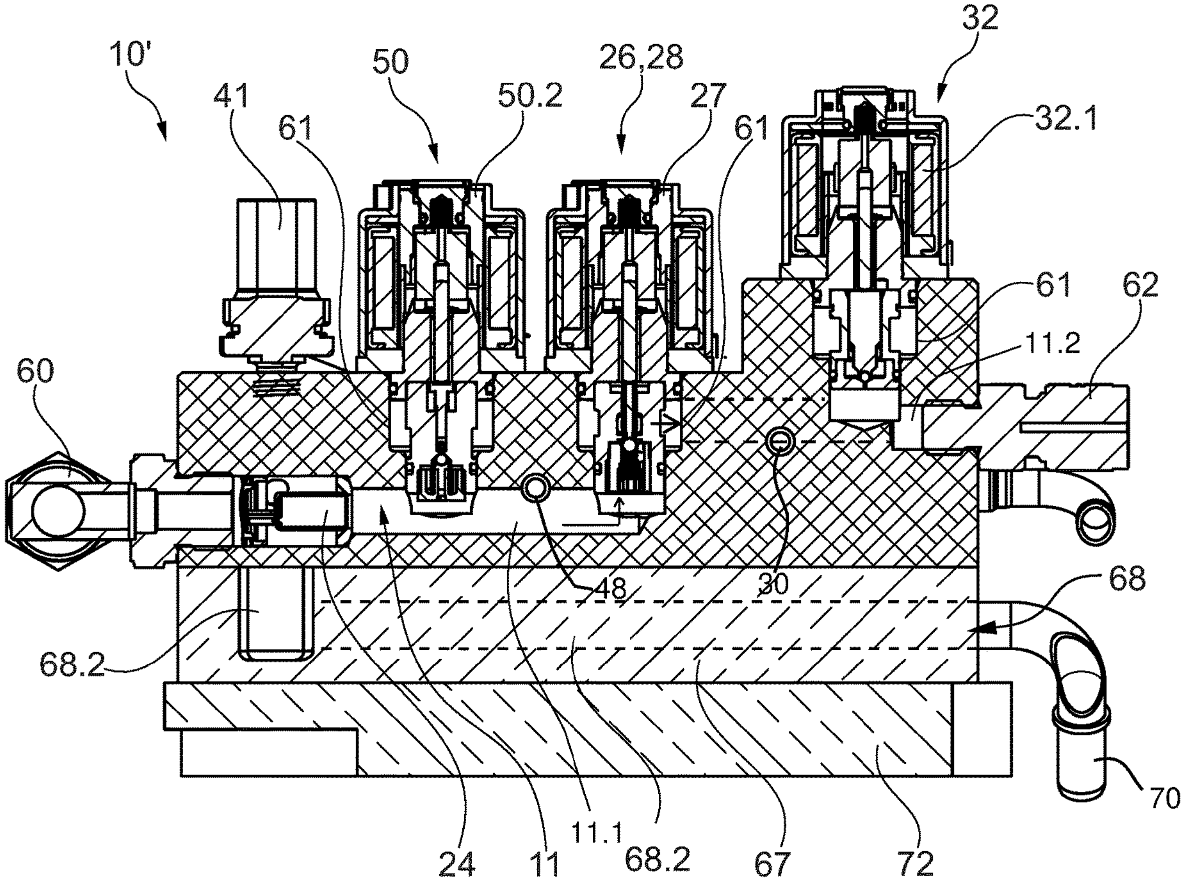
FIG. 3: is a section view through the hydrogen regulation module of FIG. 2.

FIG. 2 shows a perspective view of a HRM 10'embodying the HRM design principle of FIG. 1. FIG. 3 is a section view of HRM 10'. The common body 12 is built as a metal bloc with a plurality of recesses 61 that accommodate the various components, the recesses 61 being interconnected by the flow path 11 in the metal bloc 12, as apparent from FIG. 3. That is, the recesses have an opening that communicates with flow path 11.

Turning now more specifically to FIG. 2, one will recognize an inlet fitting 60 connecting the inlet port 14, whereas an outlet fitting 62 connects the outlet port 16. The components are indicated using the reference signs of FIG. 2. Hence common body 12 integrates: the oil dosing device 50, the pressure and temperature sensors 40, 42, the filter 24, the shut off valve 26 and HP regulator 28, the purge valve 32 and the two pressure relief valves 30, 48.

Actually in FIG. 2 only the external parts of the components are visible. That is the common electrical connector 41 for the pressure and temperature sensors. For the oil dosing device 50 the connector 50.1 and solenoid actuator 50.2 are visible. Also, an inlet oil piping 64 is visible on the side of the common body 12, to supply oil to the oil dosing device 50.

The shut off valve and HP regulator 26, 28 are here combined as a single component, whereby they are actuated by a single solenoid actuator 27 with connector 29.

As for the purge valve 32, one can see its solenoid actuator 32.1 and its connector 32.2, as well as a purge outlet fitting 33 to collect the purged hydrogen.

Reference sign 66 designates an outlet fitting for the venting port 34 to collect hydrogen released by the PRVs. There is thus a slight difference here with the diagram of FIG. 1 where the outlets of the PRVs and purge valve merge in a single outlet port.

The heat exchanger device 46 comprises a plate-like body 67 assembled to the base of the common body 12, to be in contact therewith. The body 67 includes an internal fluid channel 68 for circulating the heat transfer fluid. Reference signs 70 and 71 indicate an inlet and outlet fitting for the internal fluid channel 68. The fluid channel 68 may e.g. have a U shape, with two longitudinal channels 68.1 extending from the respective inlet and outlet fittings and interconnected at the opposite end by a transverse channel 68.2.

The common body 12 is further assembled to a mounting plate 72, which is located opposite the heat exchanger body 67. The mounting plate may have any appropriate shape, which is generally adapted to the fixing location.

In FIG. 3 one will recognize the oil dosing device 50, the combined shut off valve and HP regulator 26, 28 and the purge valve 32. The fuel filter 24 is inserted in flow path 11 in an inlet section thereof. One may note that the gas flow path 11 actually comprises two sections. The first section 11.1 is from the inlet fitting 60 to the combined shut off and pressure regulating valve 26,28. There the gas stream flows (see arrows) through the combined component 26,28, when open, and exits radially from the cylindrical body of the functional part, to reach a second section 11.2, partially shown and in communication with purge valve 32, to reach the outlet fitting 62. The positions of the upstream and downstream pressure relief valves, 48 and 30, are also indicated. They communicate with the high and low pressure sections 11.1 and 11.2 of gas flow path 11.

As can be understood, the electro-magnetically actuated components, namely the oil dosing device 50, the combined shut off valve and HP regulator 26, 28 and the purge valve 32 comprise an internal portion and an outer/external portion, basically the solenoid actuator with electrical connector.

The internal portion (or functional portion) is typically designed as a unit or cartridge, e.g. in the form of a cylindrical/tubular body that comprises a valve seat surrounding a flow orifice, and valve member that is moveable relative to the valve seat.

In general, the internal portion can be designed to provide any dedicated function. In particular the functional portion may comprise, in the flow passage, a valve arrangement to control the flow away from or towards the flow path 11 in the common body 12. For example, it can control the supply of hydrogen to the flow path 11 or its removal therefrom, or the introduction of a fluid into the stream of hydrogen flowing to path 11.

The actuating portion allows producing an actuating force to actuate a mechanical arrangement within the functional portion. For example, in case of a valve arrangement, the actuating element of the actuating portion may act on a valve member of the functional portion, in particular via a valve shaft. The valve shaft and the actuating rod could be made in one piece or two pieces. Alternatively, the functional portion can be designed as a pump, whereby the actuating element of the actuating portion acts upon a piston within a pumping chamber, an outlet valve arrangement of the pumping chamber being configured to open spontaneously when a predetermined pressure is reached in the pumping chamber.

Figure 4:
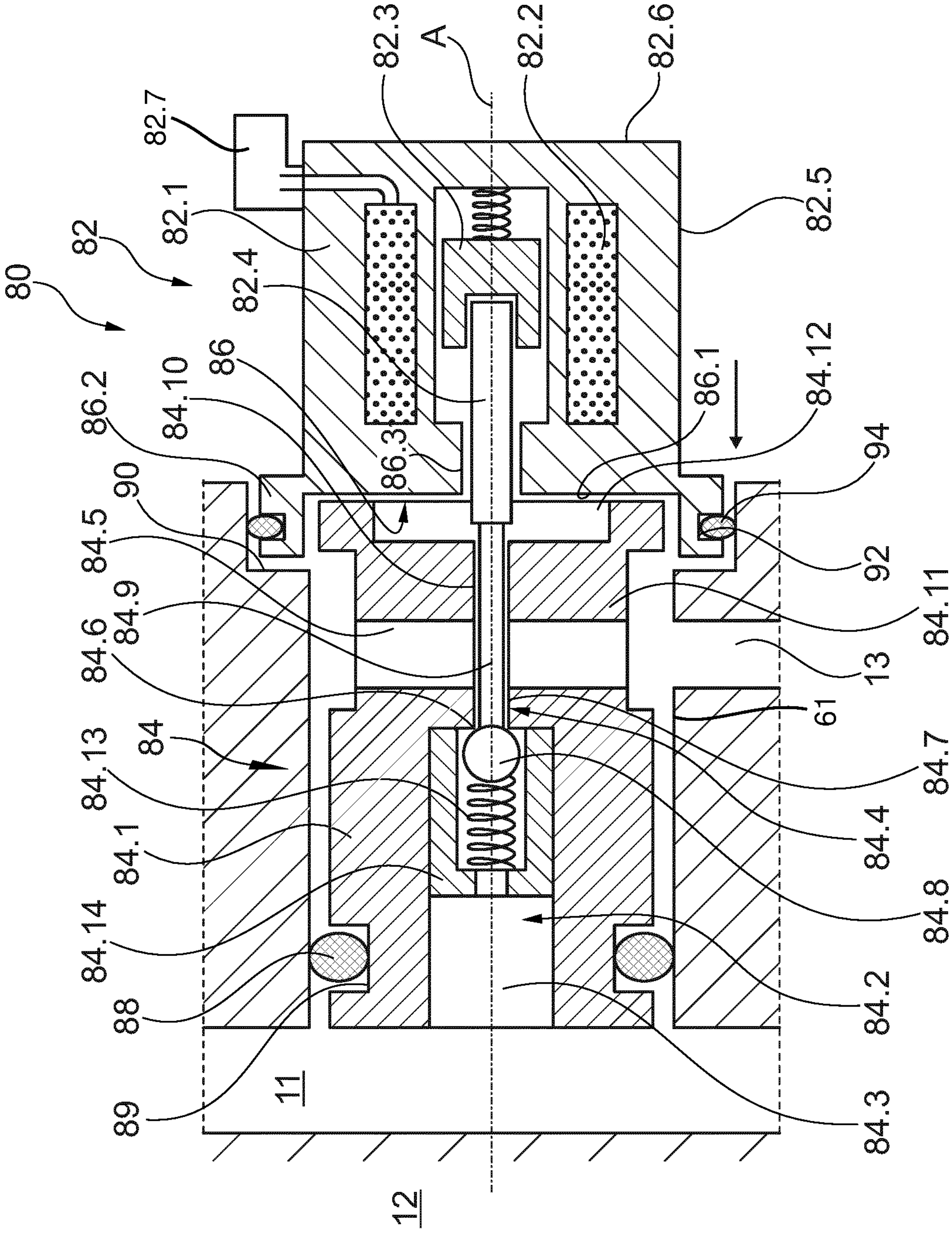
FIG. 4: is a section view through the purge valve.

This concept is illustrated in FIG. 4, which shows a component 80 with an actuator portion 82 and a functional portion 84 configured as simple on/off valve. This design corresponds to that of purge valve 32 (or a shut off valve). The functional portion 84 comprises a cylindrical body 84.1 with a flow passage 84.2 having an axial section 84.3, a seat section 84.4 and a transverse section 84.5. The seat section 84.4 comprises a valve seat 84.6 surrounding a flow orifice 84.7 (leading from axial section to transverse section). The valve seat can be opened or closed by means of a valve member 84.8, here a ball-shaped member, that can be selectively actuated by the actuator 82, here via a valve shaft 84.9. Valve shaft 84.9 is axially guided in a bore 84.10 in a body wall 84.11 delimiting the transverse channel 84.5, opposite the axial section 84.3. This side of the body 84.1 forms the coupling end, where the valve shaft is received in an end recess 84.12.

The actuator portion 82 is the external part of the component 80 and comprises, within a housing 82.1, a solenoid coil 82.2 surrounding a movable armature 82.3 that is configured to act on an actuating rod 82.4. Reference sign 82.7 designates an electrical connector with a wiring extending to the coil 82.2 As is known, energizing the coil 82.2 will generate a magnetic field that will move the armature 82.3 in the direction of the arrow towards the functional portion 84, thereby transmitting the actuating force to the functional portion 82 via actuating rod 82.4. Therefore, the actuating rod 82.4 is in axial alignment with the valve shaft 84.9 in the functional portion, which allows displacing valve member 84.8 in the direction of the arrow.

The valve member 84.8 is biased against the valve seat 84.5 (i.e. in closed position) by a spring 84.13 arranged in the axial section, maintained by a hollow screw 84.14 screwed in axial section 84.2.

The actuator portion 82 is likewise of general cylindrical shape, where the housing 82.1 delimits the lateral side 82.5 and top end 82.6. The side facing the functional portion is referred to as coupling interface 86. The coupling interface 86 comprises a cylindrical recess 86.1 surrounded by a peripheral collar 86.2. The recess 86.1 has a central opening 86.3 for the actuating rod 82.4. The coupling interface 86 is configured to cooperate with the coupling end of the functional portion, namely by form fitting. The internal diameter of recess 86.1 hence corresponds to the external diameter of the body 84.1 at the coupling end In practice, the functional portion and actuating portion may be assembled to one another by press-fitting at the coupling interface/coupling end, or by crimping, screwing or gluing. In use, pressurized hydrogen flows in flow path 11. The valve member 84.8 is biased in closing direction by spring 84.13 and can be raised from seat 84.6 by actuating the valve shaft 84.9 via the actuating rod 82.4 (when solenoid 82.2 is energized). When the valve member 84.8 is open, hydrogen can escape through axial section 84.3 and then through transverse section 84.5, from where it enters into a lateral channel 13 in the common body 12, to escape towards the dedicated purge fitting 33.

An internal sealing, towards the gas flow path 11, is provided by means of an annular seal 88 arranged in a peripheral groove 89.

As can be seen in the figures, the actuator portion 82 partly engages recess 61 with the coupling interface, coming into abutment with a shoulder 90. The collar 86.2 has an outer peripheral groove 92, in which an annular seal 94 is received, thereby providing an outer sealing.

In embodiments, the actuating portion may comprise a radial flange (not shown) by which it is screwed to the common body. In such case, in addition or alternatively to seal 94, the flange may be provided with an annular seal (not shown) that is compressed against the surface of the peripheral body.

One may note in FIG. 3 that the gas flow path 11 actually comprises two sections. The first section is from the inlet fitting 60 to the combined shut off and pressure regulating valve 26,28. There the gas stream flows (see arrows) through the combined component 26,28, when open, and exits radially from the cylindrical body of the functional part, to reach a second section 11.2, partially shown and in communication with purge valve 32, to reach the outlet fitting 62.

In practice, the HRM, and hence its various components, are designed for an operating pressure of up to about 55 bar. The regulator 28 is preferably configured to regulate the pressure between Pmin=3 bar and Pmax=40 bar. Materials are selected for operating temperatures between −40 and 125° C. and hydrogen compatibility. The upstream PRV 48 is preferably configured to open at a pressure of about 1.5×Pmax, i.e. about 60-65 bars. The downstream PRV 30 may be configured to open when the pressure downstream of the pressure regulator 28 increases by about 10, 20, or 30% above Pmax, or possibly more.

The invention claimed is:

1. A hydrogen regulation module for a hydrogen internal combustion engine, wherein the hydrogen regulation module comprises a common body that defines therein a gas flow path for a hydrogen stream, said gas flow path extending from an inlet port to an outlet port, said common body comprising:

- a shut off valve to selectively open or close the flow of hydrogen through the gas flow path;
- a pressure regulating valve configured to regulate the pressure of the hydrogen stream towards the outlet, the pressure regulating valve comprising a valve seat defining an orifice and a valve member movable relative to the valve seat by an associated electromagnetic actuator arranged outside the common body so as to adjust the flow cross-section through the orifice, the valve seat and valve member and being arranged in a recess within said common body;

a purge valve configured to allow purging the gas flow path downstream of the shut off valve;

a first pressure relief valve in fluid communication with the gas flow path downstream of the shut off valve and of the pressure regulating valve;

a filter unit to retain particles beyond a predetermined particle size, arranged upstream of said shut off valve and pressure regulating valve; and a temperature sensor and a pressure sensor arranged to determine a temperature and a pressure, respectively, of the hydrogen stream upstream of the shut off valve and of the pressure regulating valve;

wherein the shut off valve and purge valve each comprise a valve seat and valve member arranged in a recess within said common body, and an associated electromagnetic actuator arranged outside said common body; and wherein the respective recesses of the shut off valve, pressure regulating valve, and purge valve are serially arranged on said hydrogen flow path.

2. The hydrogen regulation module of claim 1, wherein the filter unit is arranged upstream of said shut off valve and of said pressure regulating valve.

3. The hydrogen regulation module of claim 1, further comprising a second pressure relief valve in fluid communication with the gas flow path upstream of the shut off valve and of the pressure regulating valve.

4. The hydrogen regulation module of claim 1, further comprising an oil dosing device arranged to discharge predetermined amounts of oil in the gas flow path.

5. The hydrogen regulation module of claim 4, wherein the oil dosing device is arranged to discharge predetermined amounts of oil in the gas flow path at a position upstream of the shut off valve and of the pressure regulating valve.

6. The hydrogen regulation module of claim 1, further comprising a heat exchanger device arranged to influence a temperature of the incoming hydrogen stream.

7. The hydrogen regulation module of claim 6, wherein said heat exchanger comprises an auxiliary body assembled to said common body, said auxiliary body having therein a fluid channel for conveying a heat-transfer fluid.

8. The hydrogen regulation module of claim 1, wherein the shut off valve and pressure regulating valve are combined as a single component.

9. The hydrogen regulation module of claim 1, comprising a further pressure regulating valve.

10. The hydrogen regulation module of claim 1, further comprising a mounting member assembled to said common body, said mounting member having a predetermined shape configured for assembly in an internal combustion engine.

11. A hydrogen internal combustion engine comprising an engine block with at least one cylinder and a hydrogen supply system comprising at least one fuel injector for injecting hydrogen into said at least one cylinder, and a hydrogen regulation module according to claim 1.

12. The hydrogen internal combustion engine according to claim 11, wherein the hydrogen regulation module is fixed to a cylinder head of the engine.

13. The hydrogen internal combustion engine according to claim 11, wherein the hydrogen regulation module is fixed to the engine block.

14. The hydrogen internal combustion engine according to claim 13, wherein the hydrogen regulation module is fixed to the engine block via a support element.

* * * * *